(12) United States Patent
Liu et al.

(10) Patent No.: US 9,146,594 B2
(45) Date of Patent: Sep. 29, 2015

(54) MOUNTING APPARATUS FOR PERIPHERAL COMPONENT INTERCONNECT CARDS

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Lei Liu, Shenzhen (CN); Guo-Yi Chen, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 120 days.

(21) Appl. No.: 14/092,948

(22) Filed: Nov. 28, 2013

(65) Prior Publication Data

US 2015/0138718 A1     May 21, 2015

(30) Foreign Application Priority Data

Nov. 15, 2013   (CN) .......................... 2013 1 05684741

(51) Int. Cl.
   *G06F 1/16*   (2006.01)
   *G06F 1/18*   (2006.01)
   *H01R 12/70*  (2011.01)

(52) U.S. Cl.
   CPC ............ *G06F 1/185* (2013.01); *H01R 12/7011* (2013.01)

(58) Field of Classification Search
   USPC ........ 439/61, 312, 676, 620.21, 78, 327, 347,
   439/607.05, 66, 67; 455/458, 558, 423,
   455/575.5, 575.1, 13.3, 12.1, 3.04;
   710/300, 15, 2, 62, 301, 302, 260, 315,
   710/308, 22; 435/69.1, 183, 320.1, 252.3,
   435/542; 361/759, 784, 748, 752, 801,
   361/679.31, 679.48, 679.4, 679.57, 679.58,
   361/679.49, 679.44, 679.32, 679.56,
   361/679.02, 679.08, 679.2, 679.33, 679.21,
   361/679.51, 679.09
   See application file for complete search history.

(56) References Cited

U.S. PATENT DOCUMENTS

| 6,030,230 | A  | * | 2/2000 | Peacock ......................... 439/61 |
| 2004/0062002 | A1 | * | 4/2004 | Barringer et al. ............. 361/687 |
| 2013/0033832 | A1 | * | 2/2013 | Chen et al. .................... 361/759 |

* cited by examiner

*Primary Examiner* — Hung Duong
(74) *Attorney, Agent, or Firm* — Novak Druce Connolly Bove + Quigg LLP

(57) ABSTRACT

A mounting apparatus configured for securing a number of peripheral component interconnect (PCI) cards includes a number of positioning members. Each positioning member includes a positioning block positioning a corresponding PCI card, an inserting portion extending away from a first side of the positioning block, and a latching portion extending away from a second side of the positioning block. The inserting portion of each of the positioning members is latched to the latching portion of an adjacent positioning member.

12 Claims, 3 Drawing Sheets

MOUNTING APPARATUS FOR PERIPHERAL COMPONENT INTERCONNECT CARDS

BACKGROUND

1. Technical Field

The present disclosure relates to an apparatus for mounting a plurality of peripheral component interconnect (PCI) cards.

2. Description of Related Art

Expansion cards, such as network cards, sound cards, graphics accelerator cards, and multi-media cards, are installed in a computer enclosure by a mounting mechanism. However, the conventional mounting mechanism only secures one end of the expansion cards to the computer enclosure. If an expansion card is too long, the mounting mechanism may not stably secure the expansion card in the computer enclosure.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean "at least one."

Figure 1:
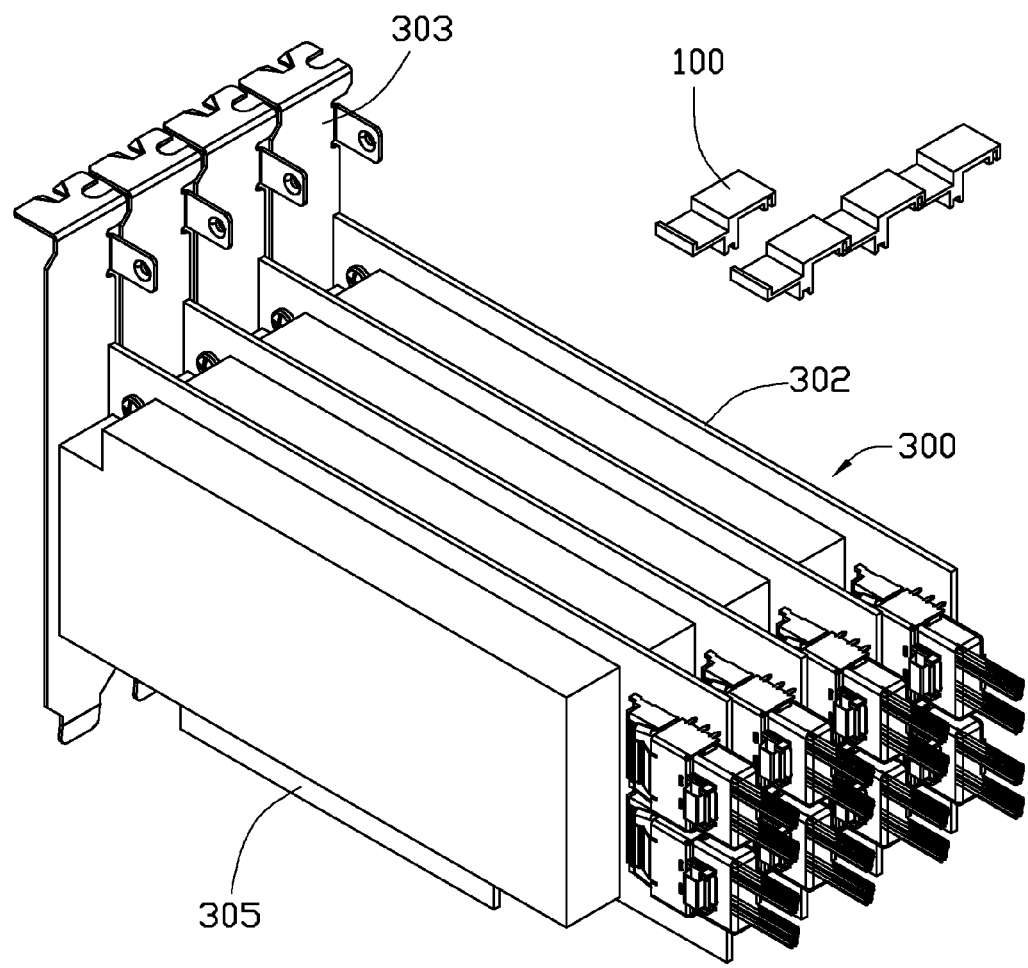
FIG. 1 is an exploded, isometric view of an embodiment of a mounting apparatus for mounting a plurality of peripheral component interconnect cards, wherein the mounting apparatus includes a plurality of mounting members.

FIG. 1 shows an embodiment of a mounting apparatus for securing a plurality of peripheral component interconnect (PCI) cards 300 in a chassis 500 (shown in FIG. 3) of an electronic device. Each PCI card 300 includes a main body 302, a latching piece 303 located at a first end of the main body 302, and an edge connector 305 extending down from a bottom side of the main body 302. The mounting apparatus includes a plurality of positioning members 100.

Figure 2:
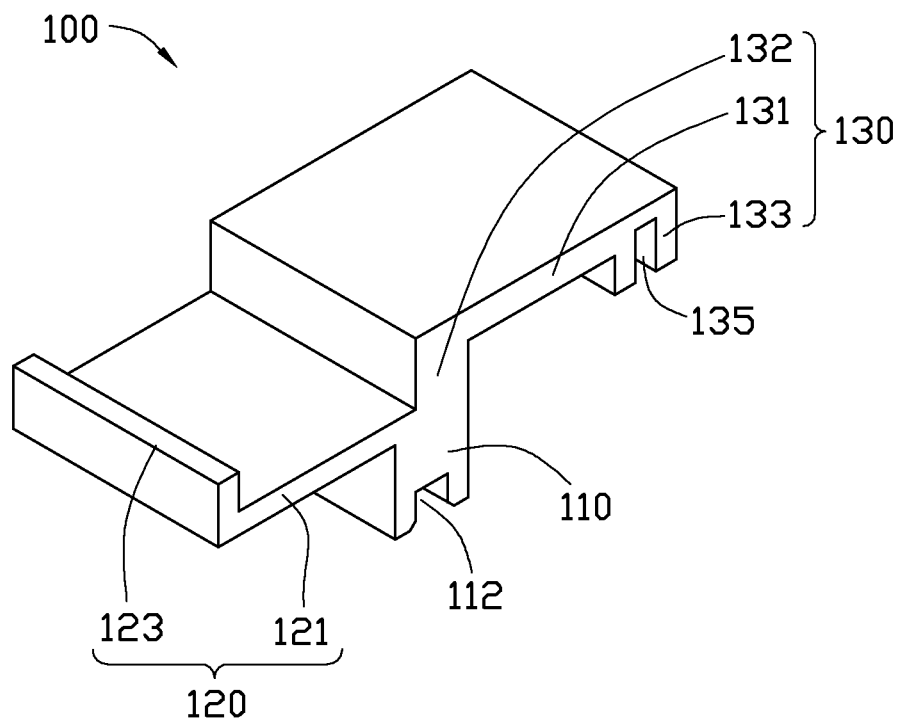
FIG. 2 is an enlarged view of one of the mounting members of FIG. 1.

FIG. 2 shows that each positioning member 100 includes a positioning block 110, an inserting portion 120 extending away from a first side of the positioning block 110, and a latching portion 130 extending away from a second side of the positioning block 110. A bottom portion of the positioning block 110 defines a positioning slot 112 for positioning a top edge of the PCI card 300. The inserting portion 120 includes a first connecting plate 121 extending substantially perpendicularly from the first side of the positioning block 110, and a bar 123 extending substantially perpendicularly up from a distal end portion of the first connecting plate 121. The latching portion 130 includes an extending plate 132 extending up from a top end of the positioning block 110, a second connecting plate 131 extending substantially perpendicularly from the extending plate 132, and a latching block 133 extending substantially perpendicularly down from a distal end portion of the second connecting plate 131. A bottom portion of the latching block 133 defines a latching slot 135. In one embodiment, the positioning member 100 is made of resilient material, such as plastic.

Figure 3:
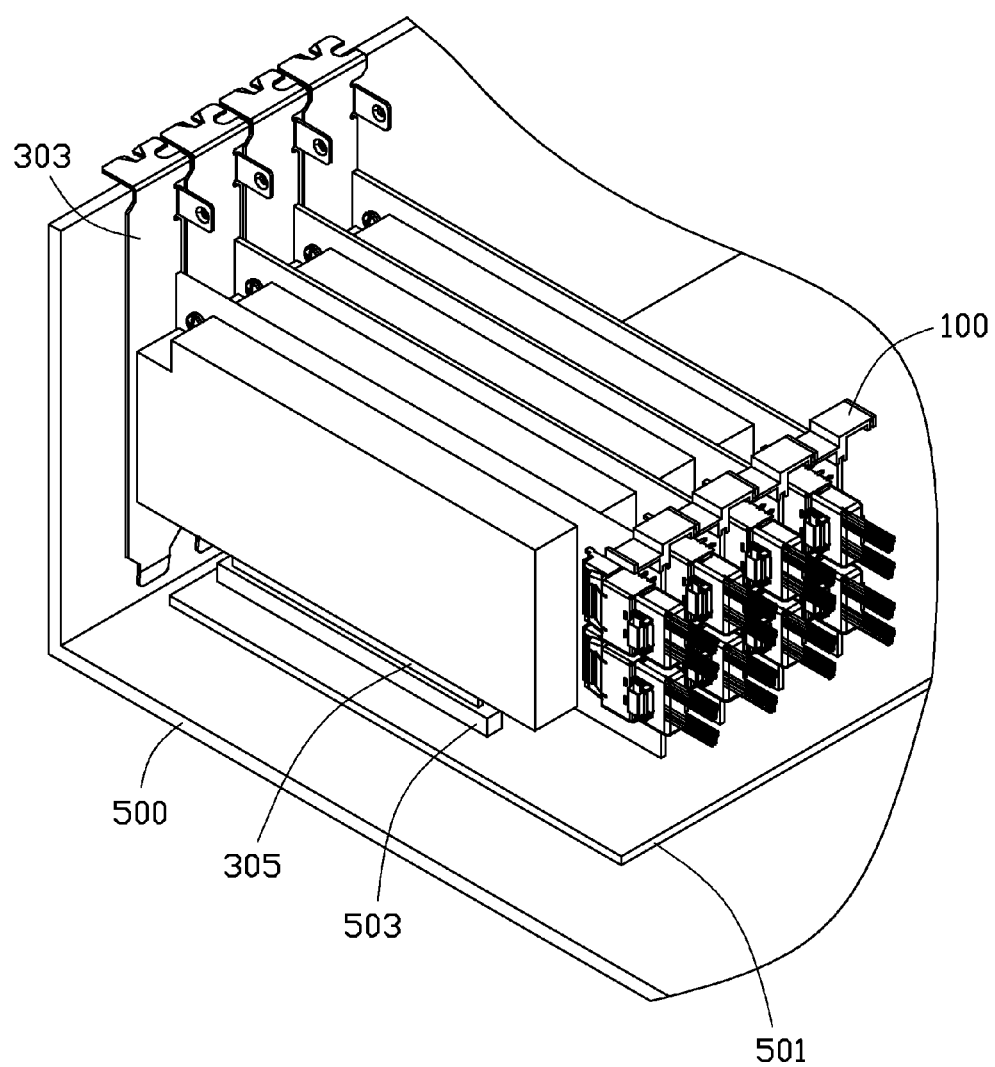
FIG. 3 is an assembled, isometric view of FIG. 1.

FIG. 3 shows that in use, the PCI cards 300 are received in a chassis 500 of an electronic device. The edge connectors 305 of the PCI cards 300 are connected to a plurality of PCI sockets 503 of a printed circuit board 501 of the electronic device. The latching pieces 303 located at the first end of the PCI cards 300 are mounted to the chassis 500. The positioning members 100 are latched to a top edge of the main bodies 302 adjacent to a second end of the PCI cards 300 by receiving the top edge of the PCI cards in the positioning slots 112. The bar 123 of the positioning members 100 is received in the latching slot 135 of an adjacent positioning member 100 to securely position the PCI cards 300. Therefore, ends of the PCI cards 300 opposite from the latching pieces 303 are securely positioned.

It is to be understood, that even though numerous characteristics and advantages of the embodiment have been set forth in the foregoing description, together with details of the structure and function of the embodiment, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. A mounting apparatus configured for securing a plurality of peripheral component interconnect (PCI) cards, the mounting apparatus comprising:

a plurality of positioning members connected in series, each positioning member comprising a positioning block positioning a corresponding PCI card, an inserting portion located at a first side of the positioning block, and a latching portion located at a second side of the positioning block;

wherein the inserting portion of each of the plurality of positioning members is latched to the latching portion of an adjacent positioning member.

2. The mounting apparatus of claim 1, wherein a bottom of the positioning block defines a positioning slot for latching a top edge of the corresponding PCI card.

3. The mounting apparatus of claim 1, wherein the inserting portion comprises a first connecting plate extending out from the first side of the positioning block and a bar extending up from an distal end the first connecting plate.

4. The mounting apparatus of claim 3, wherein the latching portion comprises an extending plate extending up from a top of the positioning block, a second connecting plate extending out from the extending plate and extending away from the first connecting plate, and a latching block extending down from a distal end of the second connecting plate.

5. The mounting apparatus of claim 4, wherein a bottom of the latching block of each positioning member defines a latching slot, the bar of each of the plurality of positioning members is latched in the latching slot of an adjacent positioning member.

6. The mounting apparatus of claim 1, wherein each positioning member is made of resilient material.

7. The mounting apparatus of claim 6, wherein the resilient material is plastic.

8. An electronic device, comprising:
a chassis;
a circuit board mounted in the chassis, and comprising a plurality of peripheral component interconnect (PCI) sockets;

a plurality of PCI cards connected to the plurality of PCI sockets with bottom sides; and a mounting apparatus comprising a plurality of positioning members;

wherein each positioning member comprises a positioning block positioning a top side of a corresponding PCI card, an inserting portion located at a first side of the positioning block, and a latching portion located at a second side of the positioning block, the inserting portion of each of the plurality of positioning members is latched to the latching portion of an adjacent positioning member.

9. The electronic device of claim 8, wherein each PCI card comprises a main body, a latching piece located at a first end of the main body, and an edge connector extending down from a bottom side of the main body, the latching piece is mounted to the chassis, the edge connector is inserted in the corresponding PCI socket, a bottom of the positioning block defines a positioning slot, a second end of the main body of each PCI card is latched in the positioning slot of the corresponding positioning member.

10. The electronic device of claim 8, wherein the inserting portion comprises a first connecting plate extending out from the first side of the positioning block and a bar extending up from a distal end of the first connecting plate.

11. The electronic device of claim 10, wherein the latching portion comprises an extending plate extending up from a top of the positioning block, a second connecting plate extending out from the extending plate and extending away from the first connecting plate, and a latching block extending down from a distal end of the second connecting plate.

12. The electronic device of claim 11, wherein a bottom of the latching block of each positioning member defines a latching slot, the bar of each of the plurality of positioning members is latched in the latching slot of an adjacent positioning member.

* * * * *